United States Patent
Meyer et al.

(10) Patent No.: US 10,407,541 B2
(45) Date of Patent: Sep. 10, 2019

(54) BLOCK CO-CONDENSATES OF POLYSILOXANES AND DIHYDROXYDIPHENYLCYCLOALKANE-BASED N (CO)POLYCARBONATES

(71) Applicant: Covestro Deutschland AG, Leverkusen (DE)

(72) Inventors: Alexander Meyer, Düsseldorf (DE); Klaus Horn, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/564,524

(22) PCT Filed: Apr. 4, 2016

(86) PCT No.: PCT/EP2016/057326
§ 371 (c)(1),
(2) Date: Oct. 5, 2017

(87) PCT Pub. No.: WO2016/162301
PCT Pub. Date: Oct. 13, 2016

(65) Prior Publication Data
US 2018/0079862 A1    Mar. 22, 2018

(30) Foreign Application Priority Data

Apr. 7, 2015  (EP) .................... 15162554

(51) Int. Cl.
| | | |
|---|---|---|
| *C08G 64/18* | (2006.01) | |
| *C08G 77/448* | (2006.01) | |
| *C08G 81/00* | (2006.01) | |
| *C08G 81/02* | (2006.01) | |
| *C08L 83/10* | (2006.01) | |
| *C08L 69/00* | (2006.01) | |

(52) U.S. Cl.
CPC ......... *C08G 64/186* (2013.01); *C08G 77/448* (2013.01); *C08G 81/00* (2013.01); *C08G 81/027* (2013.01); *C08L 83/10* (2013.01); *C08L 69/00* (2013.01)

(58) Field of Classification Search
None
See application file for complete search history.

(56) References Cited

U.S. PATENT DOCUMENTS

| | | |
|---|---|---|
| 3,189,662 A | 6/1965 | Vaughn, Jr. |
| 3,419,634 A | 12/1968 | Vaughn, Jr. |
| 4,584,360 A | 4/1986 | Paul et al. |
| 4,707,393 A | 11/1987 | Vetter |
| 5,109,076 A | 4/1992 | Freitag et al. |
| 5,227,449 A | 7/1993 | Odell et al. |
| 5,288,778 A | 2/1994 | Schmitter et al. |
| 5,414,054 A | 5/1995 | Jonsson et al. |
| 5,783,651 A | 7/1998 | König et al. |
| 5,821,321 A | 10/1998 | Archey et al. |
| 5,821,380 A | 10/1998 | Holderbaum et al. |
| 5,846,659 A | 12/1998 | Löwer et al. |
| 5,883,165 A | 3/1999 | Kröhnke et al. |
| 6,066,700 A | 5/2000 | König et al. |
| 8,044,122 B2 | 10/2011 | Ruediger et al. |
| 8,158,745 B2 | 4/2012 | Wehrmann et al. |
| 2008/0081895 A1* | 4/2008 | Lens ............ C08G 64/186 528/196 |
| 2012/0004375 A1* | 1/2012 | Heuer ............ C08G 64/04 525/469 |
| 2013/0267665 A1 | 10/2013 | Huggins et al. |

FOREIGN PATENT DOCUMENTS

| | | |
|---|---|---|
| DE | 334782 C | 3/1921 |
| DE | 3842931 A1 | 6/1990 |
| DE | 19539290 A1 | 4/1997 |
| DE | 19710081 A1 | 9/1998 |
| DE | 102007011069 A1 | 9/2008 |
| DE | 102008019503 A1 | 10/2009 |
| EP | 0110221 A2 | 6/1984 |
| EP | 0110238 A2 | 6/1984 |
| EP | 122535 A2 | 10/1984 |
| EP | 0374635 A2 | 6/1990 |
| EP | 0500496 A1 | 8/1992 |
| EP | 0716919 A2 | 6/1996 |
| EP | 0839623 A1 | 5/1998 |
| EP | 1308084 A1 | 5/2003 |
| WO | WO-9615102 A2 | 5/1996 |

OTHER PUBLICATIONS

International Search Report for PCT/EP2016/057326 dated Jun. 3, 2016.
Written Opinion of the International Searching Authority for PCT/EP2016/057326 dated Jun. 3, 2016.
Zhou, W., et al., "Siloxane modification of polycarbonate for superior flow and impact toughness", Polymer, 2010, pp. 1990-1999.

* cited by examiner

*Primary Examiner* — David J Buttner
(74) *Attorney, Agent, or Firm* — Drinker Biddle & Reath LLP

(57) ABSTRACT

The present invention relates to block cocondensates of polysiloxanes and dihydroxydiarylcycloalkane-based (co)polycarbonates and also to a process for preparing such block cocondensates. The invention further relates to the use of these block cocondensates for producing mouldings and extrudates.

15 Claims, No Drawings

BLOCK CO-CONDENSATES OF POLYSILOXANES AND DIHYDROXYDIPHENYLCYCLOALKANE-BASED N (CO)POLYCARBONATES

CROSS-REFERENCE TO RELATED APPLICATIONS

This application is a national stage application (under 35 U.S.C. § 371) of PCT/EP2016/057326, filed Apr. 4, 2016, which claims benefit of European Application No. 15162554.8, filed Apr. 7, 2015, both of which are incorporated herein by reference in their entirety.

The present invention relates to block cocondensates of polysiloxanes and dihydroxydiarylcycloalkane-based (co)polycarbonates and also to a process for preparing such block cocondensates. The invention further relates to the use of these block cocondensates for producing mouldings and extrudates.

BACKGROUND OF THE INVENTION

It is known that polysiloxane-polycarbonate block cocondensates exhibit good properties in respect of low-temperature impact strength and low-temperature notched-impact strength, chemical resistance and outdoor weathering resistance and also in their ageing properties and flame resistance. In these properties they are superior in some cases to the conventional polycarbonates (bisphenol A-based homopolycarbonate).

These cocondensates are prepared starting from the monomers industrially mostly via the interfacial process with phosgene. Also known is the preparation of these siloxane cocondensates via the melt transesterification process using diphenyl carbonate, A disadvantage of these processes is that the industrial plants they utilize are used for producing standard polycarbonate and are therefore large in size. The preparation of specific block cocondensates in these plants is often not economically rational, owing to the smaller volume of these products. Furthermore, the feedstocks needed for preparing the cocondensates, such as the polydimethylsiloxanes, for example, may adversely affect the plant, since they can lead to fouling of the plant or of the solvent circuits. Moreover, the preparation requires toxic feedstocks such as phosgene or entails a high energy demand, as in the melt transesterification process.

The preparation of polysiloxanecarbonate block copolymers via the interfacial process is known from the literature and described for example in U.S. Pat. Nos. 3,189,662, 3,419,634, DE 3,34,782 and EP 122,535.

The preparation of polysiloxanecarbonate block copolymers by the melt transesterification process from bisphenol, diaryl carbonate, silanol end-terminated polysiloxanes and catalyst is described in U.S. Pat. No. 5,227,449. Siloxane compounds used here are polydiphenyl- and/or polydimethyl-siloxane telomers having silanol end groups. It is known, however, that dimethylsiloxanes of this kind with silanol end groups, in contrast to diphenylsiloxane with silanol end groups, exhibit an increasing tendency towards self-condensation in an acidic or basic medium with decreasing chain length, thereby hindering their integration into the copolymer that forms. Cyclic siloxanes formed in this process remain in the polymer and are exceptionally disruptive to applications in the electricallelectronics sector.

Disadvantageous features affecting all of these processes are the use of organic solvents in at least one step of the synthesis of the silicone-polycarbonate block copolymers, the use of phosgene as a feedstock, or the inadequate quality of the cocondensate. In particular, the synthesis of the cocondensates starting from the monomers is very costly and inconvenient, both in the interfacial process and also, in particular, in the melt transesterification process. in the case of melt processes, for example, a low vacuum and low temperatures must be employed in order to prevent evaporation and hence removal of the monomers. Only in later reaction stages, in which oligomers with a higher molar mass have formed, is it possible to employ lower pressures and higher temperatures. This means that the reaction must he conducted over several stages and the reaction times are therefore correspondingly long.

With the aim of avoiding the disadvantages described above, other known processes start from commercial polycarbonates. This is described in U.S. Pat. Nos. 5,414,054 and 5,821,321, for example. Here, a conventional polycarbonate is reacted with a specific polyditnethylsiloxane in a reactive extrusion process. A disadvantage of these processes is the use of highly active transesterification catalysts, which permit production of the cocondensates on an extruder within short residence times. These transesterification catalysts, however, remain in the product and cannot, or cannot adequately, be deactivated. Consequently, injection mouldings produced from the cocondensates prepared accordingly exhibit inadequate ageing characteristics, especially inadequate thermal ageing characteristics. Furthermore, specific and hence expensive siloxane blocks have to be used.

DE 19710081 describes a process for preparing the stated cocondensates in a melt transesterification procedure, starting from an oligocarbonate and a specific hydroxyarylsiloxane. The preparation of the oligocarbonate as well is described in that application. However, the large-scale preparation of oligocarbonates for the purpose of preparing specific cocondensates of relatively low volume is very costly and inconvenient. These oligocarbonates have relatively low molecular weights and relatively high OH end group concentrations. On account of their low chain length, these oligocarbonates frequently have phenolic OH concentrations of more than 1000 ppm. Products of this kind are normally unavailable commercially and would have to be produced especially, therefore, for preparing the cocondensates. It is not economic, though, to operate large-scale industrial plants with the production of small-volume precursor products. Furthermore, precursor products of this kind are much more reactive than conventional commercial products of high molecular mass based on polycarbonate, owing to the impurities present in these products, such as residual solvents, residual catalysts, unreacted monomers, etc., for example. For these reasons, corresponding precursor products or aromatic oligocarbonates suitable for the preparation of such block cocondensates are not available commercially. Moreover, the process presented in DE 19710081 does not allow the preparation of block cocondensate within short reaction times. Both the preparation of the oligocarbonate and the preparation of the block cocondensate take place over a number of stages with residence times totaling well above an hour. Furthermore, the resulting material is not suitable for the preparation of cocondensates, since the high concentration of OH end groups and also other impurities, such as residual catalyst constituents, for example, lead to a poor colour in the end product.

Block cocondensates of polysiloxane and copolycarbonate based on dihydroxydiphenylcycloalkanes are known in principle. The preparation of block cocondensates of this kind in an interfacial process is described in EP 0374635 and DE 38 42 931. The preparation of such block cocondensates in a melt transesterification process or reactive extrusion process, in contrast, is not described. The materials described in EP 0374635 are notable for high heat distortion resistance and high notched impact strength. There is no description of the rheological properties, Starting from the prior art as outlined, the object, therefore, was that of providing moulding compositions based on siloxane-containing block cocondensates that are distinguished by high heat distortion resistance and high notched impact strength and that can be prepared by an improved or simplified process. The block cocondensates are intended additionally to possess good rheological properties.

This object has been solved by the subject matter of the claims.

It has surprisingly been found that block cocondensates of polysiloxanes and dihydroxydiarylcycloalkane-based (co)polycarbonates are preparable starting from commercial polycarbonates. Hence it is possible to avoid the use both of phosgene and of bisphenol A and diphenyl carbonate as monomers.

Surprisingly it has emerged, furthermore, that a siloxane block copolycarbonate obtained in a melt transesterification process and prepared starting from copolycarbonate comprising dihydroxydiphenylcycloalkyl derivatives does not have the good mechanical properties described in EP 0374635. The skilled person would assume that the process has no influence on the resultant properties of the block cocondensate, That person would instead expect the profile of properties to be dependent exclusively on the composition of the block cocondensate.

Found surprisingly has been a process with which it is possible to prepare a block cocondensate comprising siloxane blocks and dihydroxydiphenylcycloalkane-based structural units in a melt transesterification procedure from the corresponding polysiloxanes and polycarbonate(s). The cocondensates feature a combination of high notched impact strength and high heat distortion resistance. These block cocondensates further have good rheological properties, The invention accordingly provides block cocondensates comprising (A) 1-80 wt % of structural units of the general formula (1), based on the total weight of the block cocondensate,

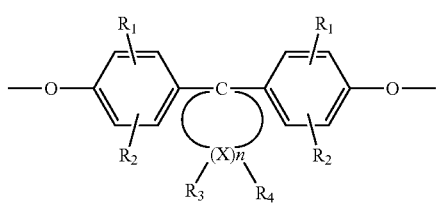

in which
R$^1$ and R$^2$ independently of one another are hydrogen, halogen, C$_1$-C$_8$ alkyl, C$_5$-C$_6$ cycloalkyl, phenyl or C$_7$-C$_{12}$ aralkyl, R$^3$ and R$^4$ for each X are individually selectable and independently of one another are hydrogen or C$_1$-C$_6$ alkyl, and n is an integer from 4 to 7,
X is carbon,
with the proviso that on at least one atom X R$^3$ and R$^4$ are C$_1$-C$_6$ alkyl;

(B) siloxane blocks of the general formula (2)

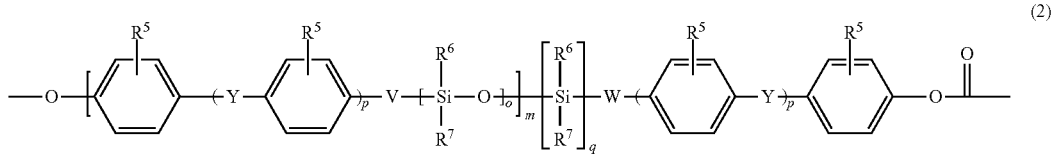

where
R$^5$ is H, Cl, Br, C$_1$ to C$_4$ alkyl or C$_1$ to C$_4$ alkoxy,
R$^6$ and R$^7$ independently of one another are selected from aryl, C$_1$ to C$_{10}$ alkyl and C$_1$ to C$_{10}$ alkylaryl,
V is O, S, C$_1$ to C$_6$ alkyl or C$_1$ to C$_6$ alkoxy,
W is a single bond, S, C$_1$ to C$_6$ alkyl or C$_1$ to C$_6$ alkoxy,
Y is a single bond, —CO—, —O—, C$_1$ to C$_6$ alkylene, C$_2$ to C$_5$ alkylidene, is a C$_5$ to C$_6$ cycloalkylidene radical which may be substituted one or more times by C$_1$ to C$_4$ alkyl, or is C$_6$ to C$_{12}$ arylene, which may he fused to a further aromatic ring containing heteroatoms,
m is an average number of repeat units from 1 to 10,
o is an average number of repeat units from 1 to 500, and
p and q are each 0 or 1; and (C) homopolycarbonate blocks which contain no structural units of the formula (1) and have a number-average molecular weight M$_n$ of at least 2000 g/mol.

Definitions

"C$_1$-C$_4$ alkyl" for the purposes of the invention is for example methyl, ethyl, n-propyl, isopropyl, n-butyl, sec-butyl, tert-butyl. "C$_1$-C$_6$ alkyl", furthermore, is for example n-pentyl, 1-methylbutyl, 2-methylbutyl, 3-methylbutyl, neopentyl, 1-ethylpropyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, "C$_1$-C$_{10}$ alkyl", furthermore, is for example n-heptyl and n-octyl, pinacyl, n-nonyl, n-decyl, and C$_1$-C$_{34}$ alkyl, furthermore, is for example n-dodecyl, n-tridecyl, n-tetradecyl, n-hexadecyl or n-octadecyl.

The same applies in respect of the corresponding alkyl radical in alkoxy radicals, alkylene radicals and alkylidene radicals, for example.

"Aryl" is a carbocyclic aromatic radical having 6 to 34 skeletal carbon atoms. The same applies to an arylene radical and also to the aromatic moiety of an arylalkyl radical, also called aralkyl radical, and also to aryl constituents of more complex groups, such as arylcarbonyl radicals, for example. Examples of "C$_6$-C$_{34}$ aryl" are phenyl, o-, p-, m-tolyl, naphthyl, phenanthrenyl, anthracenyl or fluorenyl.

"Arylalkyl" or "aralkyl" in each case independently is a straight-chain, cyclic, branched or unbranched alkyl radical as defined above, which may be substituted one or more times or completely by aryl radicals as defined above.

"Alkylaryl" is an alkyl radical as defined above bonded via an aryl radical as defined above.

"$C_1$-$C_6$ alkylene" is a straight-chain or branched alkylene radical having 1 to 6 carbon atoms.

"$C_2$-$C_5$ alkylidene" is a $C_2$-$C_5$ alkyl radical as defined above that is bonded via a double bond.

"$C_6$ to $C_{12}$ arylene" is an arylene radical having 6 to 12 aromatic carbon atoms.

"$C_5$ cycloalkyl" is a cyclopentanyl radical and "$C_6$ cycloalkyl" is a cyclohexanyl radical.

"$C_5$-$C_6$ cycloalkylidene" is a $C_5$-$C_6$ cycloalkyl radical as defined above that is doubly bonded via a carbon atom.

The recitations above are by way of example and should not be understood as imposing any limitation.

For the purposes of the present invention, ppb and ppm—unless otherwise indicated—refer to parts by weight.

Furthermore, preferred embodiments stated in the present invention can be combined with one another and should not be viewed exclusively as an isolated modification.

Component (A)

The block cocondensate of the invention comprises as component (A) 1-80 wt % of structural units of the general formula (1), the quantity figure being based on the total weight of the block cocondensate.

The amount of structural units of the formula (1) is preferably 5.0 to 75 wt %, more preferably 10 to 70 wt % and very preferably 20 to 70 wt %, based in each case on the total weight of the block cocondensate.

In particularly preferred structural units of the formula (1), ($R^1$ and $R^2$ independently of one another are methyl, phenyl or H and n is an integer from 4 to 5.

Especially preferred structural units of the general formula (1) derive from 1,1-bis(4-hydroxyphenyl)-3,3,5-trimethylcyclohexane (bisphenol TMC).

The structural units of the general formula (1) are present preferably in the form of copolycarbonate blocks, containing the structural units of the general formula (1), in the cocondensate.

The copolycarbonate blocks preferably further have structural units which derive from a diphenol of the general formula (3)

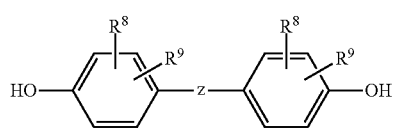

(3)

in which
$R^8$ and $R^9$ independently of one another are H, $C_1$-$C_{18}$ alkyl, $C_1$-$C_{18}$ alkoxy, halogen or optionally substituted aryl or aralkyl, preferably H or $C_1$-$C_{12}$ alkyl, more preferably H or $C_1$-$C_8$ alkyl and very preferably H or methyl, and Z is a single bond, —CO—, —O—, $C_1$ to $C_6$ alkylene, $C_2$ to $C_5$ alkylidene, or is $C_6$ to $C_{12}$ arylene, which may be fused to a further aromatic ring containing heteroatoms, and more preferably is isopropylidene.

Suitable diphenols of the formula (3) are, for example, hydroquinone, resorcinol, bis(hydroxyphenyl)alkanes, bis(hydroxyphenyl) ethers, bis(hydroxyphenyl) ketones, α,α'-bis(hydroxyphenyl)diisopropylbenzenes, and also the alkylated, ring-alkylated and ring-halogenated compounds thereof.

Further-preferred diphenols of the formula (3) are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, 2,4-bis(3,5-dimethyl-4-hydroxyphenyl)-2-methylbutane and 1,3-bis[2-(3,5-dimethyl-4-hydroxyphenyl)-2-propyl]benzene.

Particularly preferred diphenols of the formula (3) are 2,2-bis(4-hydroxyphenyl)propane (bisphenol A) and 2,2-bis(3-methyl-4-hydroxyphenyl)propane. Especially preferred is bisphenol A.

Component (B)

The block cocondensate of the invention comprises as component (B) siloxane blocks of the general formula (2).

In the general formula (2) $R^5$ is preferably H or methyl, more preferably H.

$R^6$ and $R^7$ are preferably methyl.

Y is preferably a single bond, —CO—, —O—, $C_1$ to $C_5$ alkylene, $C_2$ to $C_5$ alkylidene, or a $C_5$ to $C_6$ cycloalkylidene radical which may be substituted one or more times by $C_1$ to $C_4$ alkyl, and more preferably is a single bond, —O—, isopropylidene, or a $C_5$ to $C_6$ cycloalkylidene radical which may be substituted one or more times by $C_1$ to $C_4$ alkyl, and more particularly is isopropylidene.

Preferably o is an average number of repeat units from 10 to 400, more preferably 10 to 100, very preferably 20 to 60.

Preferably m is an average number of repeat units from 1 to 6, more preferably 2 to 5.

The product of o times m is preferably a number between 12 and 400, more preferably 15 and 200.

Particularly preferred siloxane blocks of the formula (2) are those in which V is O, W is a single bond and q is 0. These siloxane blocks have the general formula (2a):

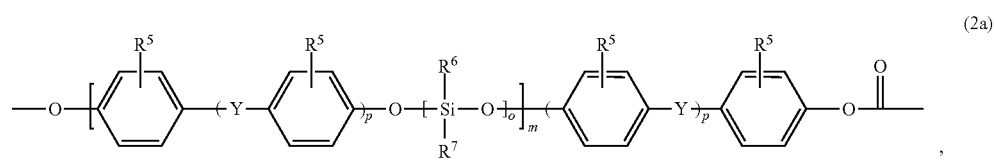

(2a)

where $R^5$, $R^6$, $R^7$, Y, o, p and m have the same definition as in formula (2).

Especially preferred structures of the formula (2a) are those in which $R^5$ is H or methyl, more preferably H, $R^5$ and $R^7$ are methyl, and Y is a single bond, —O—, isopropylidene or is a $C_5$ to $C_6$ cycloalkylidene radical which may be substituted one or more times by $C_1$ to $C_4$ alkyl, and more particularly is isopropylidene.

It is preferred here for m to be an average number of repeat units from 1 to 6, preferably 2 to 5, for o to be an average number of repeat units from 1 to 100, and for p to be 0 or 1, and for the product of m times o to be a number between 15 and 200.

The fraction of the siloxane blocks of the formula (2), preferably (2a), in the block cocondensate is preferably 0.5 to 20.0 wt %, more preferably 1.0 to 10 wt %, based on the total weight of the block cocondensate.

Component (C)

The block cocondensate of the invention comprises as component (C) homopolycarbonate blocks which contain no structural units of the formula (1) and which have a number-average molecular weight $M_n$ at least 2000 g/mol.

The number-average molecular weight $M_n$ of the homopolycarbonate blocks is preferably at least 4000 g/mol, more preferably 5000 to 20 000 g/mol.

The homopolycarbonate blocks preferably have structural units of the general formula (3)

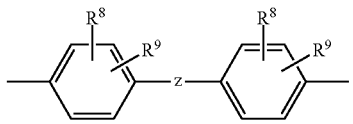

(3)

where Z, $R^8$ and $R^9$ have the meaning already defined in connection with component (A).

Particularly preferred homopolycarbonates are those based on a diphenol selected from the group consisting of 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane and 1,3-bis[2-(3,5-dimethyl-4-hydroxyphenyl)-2-propyl]benzene.

Especially preferred are homopolycarbonates based on bisphenol A.

The homopolycarbonate blocks which are used for the preparation have an average molecular weight $M_n$ of at least 2000 g/mol, measured according to gel permeation chromatography with polycarbonate standard, and may derive from a homopolycarbonate which has been obtained by the melt transesterification process or by the interfacial process. The homopolycarbonate can be linear or branched.

The homopolycarbonate blocks preferably derive from a homopolycarbonate which has been obtained by the melt transesterification process, referred to below as "melt polycarbonate". It is known that a melt polycarbonate (SPC) has a number of differences relative to a solution-prepared polycarbonate (LPC). One difference are increased levels of phenolic OH end groups in the case of the SPC. A further difference are the branching-agent structures present in the SPC, which form as a result of Fries rearrangement in the melt.

In one preferred embodiment, accordingly, the block cocondensates of the invention have one or more branching-agent structures of the formulae (I) to (IV),

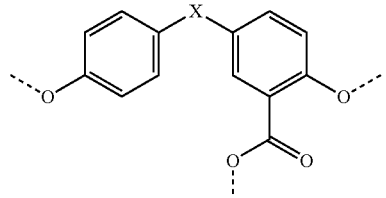

(I)

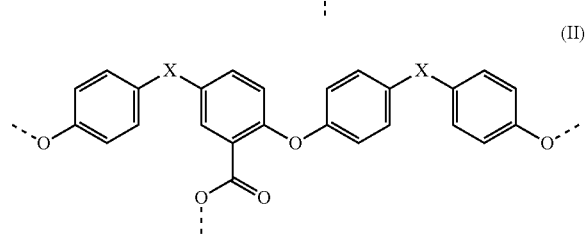

(II)

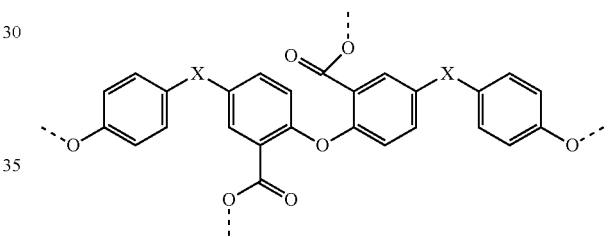

(III)

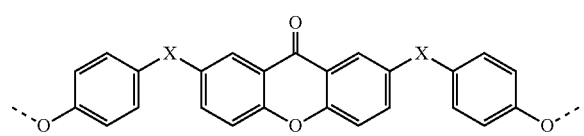

(IV)

where the phenyl rings are unsubstituted or independently of one another may be substituted once or twice by $C_1$ to $C_8$ alkyl and/or halogen, preferably $C_1$ to $C_4$ alkyl, more preferably methyl, but are preferably unsubstituted, X is a single bond, $C_1$ to $C_6$ alkylene, $C_2$ to $C_5$ alkylidene or $C_5$ to $C_6$ cycloalkylidene which may be substituted one or more times by $C_1$ to $C_4$ alkyl, and preferably is a single bond or $C_1$ to $C_4$ alkylene, and especially preferably is isopropylidene, and the linkages indicated by—in the structural units (I) to (IV) are in each case part of a carboxyl group.

The total amount of the structural units (I) to (IV) is preferably 50 to 2000 ppm, more preferably 50 to 1000 ppm, especially preferably 80 to 850 ppm (determined by hydrolysis, based on the homopolycarbonate blocks).

The branching-agent structures (I) to (IV) here are incorporated into the polymer chain of the block cocondensate, preferably into the homopolycarbonate blocks.

In order to determine the amount of the branching-agent structures, the block cocondensate in question is subjected to total hydrolysis so as to form the corresponding degradation products of the formulae (Ia) to (IVa), the quantity of which is determined by HPLC. (This may be done, for example, as follows: the polycarbonate sample is hydrolysed under reflux using sodium methoxide. The corresponding solution is acidified and concentrated to dryness. The residue from drying is dissolved in acetonitrile and the phenolic compounds of the formulae (Ia) to (IVa) are determined by means of HPLC with UV detection.)

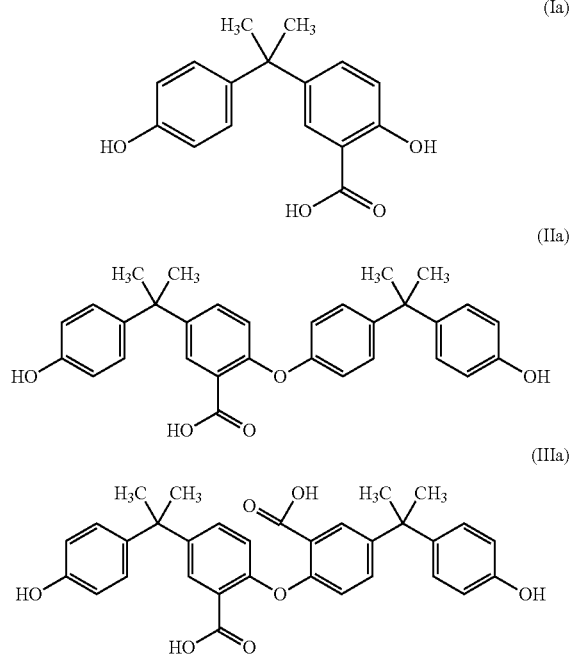

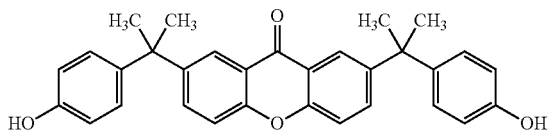

The amount of the compound of the formula (Ia) released in this procedure is preferably 20 to 800 ppm, more preferably 25 to 700 ppm and especially preferably 30 to 500 ppm, based on the homopolycarbonate blocks.

The amount of the compound of the formula (IIa) released in this procedure is preferably 0 (i.e. below the detection limit of 10 ppm.) to 100 ppm, more preferably 0 to 80 ppm and especially preferably 0 to 50 ppm, based on the homopolycarbonate blocks.

The amount of the compound of the formula (IIIa) released in this procedure is preferably 0 (i.e. below the detection limit of 10 ppm) to 800 ppm, more preferably 10 to 700 ppm and especially preferably 20 to 600 ppm, and with very particular preference 30 to 350 ppm, based on the homopolycarbonate blocks.

The amount of the compound of the formula (IVa) released in this procedure is preferably 0 (i.e. below the detection limit of 10 ppm) to 300 ppm, preferably 5 to 250 ppm and especially preferably 10 to 200 ppm, based on the homopolycarbonate blocks.

For reasons of simplification, the quantity of the structures of the formulae (I) to (IV) is made equal to the quantity of the compounds of the formulae (Ia) to (IVa) released.

The preparation of polycarbonates comprising the structural elements (I) to (IV) is known from DE 102008019503.

The fraction of the structural units of the formula (3) in the block cocondensate is preferably at least 10.0 wt %, more preferably at least 20.0 wt %, based on the total weight of the block cocondensate.

Process

The block cocondensates of the invention can be obtained by reaction of the corresponding hydroxyaryloxy-terminated siloxanes with (co)polycarbonates comprising structural units of the formula (1) and homopolycarbonates.

A further subject of the invention is therefore a process for preparing a block cocondensate of the invention, comprising the reaction of (a) a (co)polycarbonate comprising structural units of the general formula (1)

(b) a hydroxyaryl-terminated polysiloxane of the formula (2b)

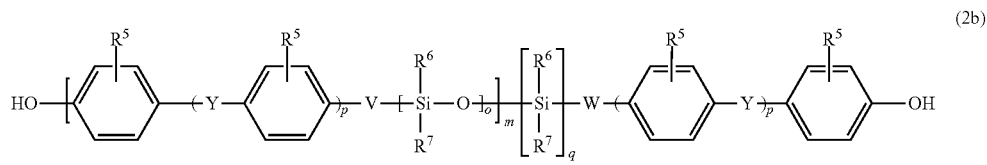

where $R^5$, $R^6$, $R^7$, V, W, Y, o, p, q and m have the same definition as in formula (2); and (c) and a homopolycarbonate in the melt.

The reaction takes place preferably at temperatures of 280° C. to 400° C., more preferably 300° C. to 390° C., with further preference of 320° C. to 380° C. and very preferably of 330° C. to 370° C. under pressures of 0.001 mbar to 50 mbar, preferably 0.005 mbar to 40 mbar, especially preferably 0.02 to 30 mbar and very preferably 0.03 to 5 mbar, preferably in the presence of a catalyst.

The preparation of the block cocondensates present in accordance with the invention requires as component (a) (co)polycarbonates (i.e. homo- or copolycarbonates) based on bisphenols of the formula (1') and optionally one or more further diphenols of the formula (3)—as described in connection with component A of the block cocondensate of the invention.

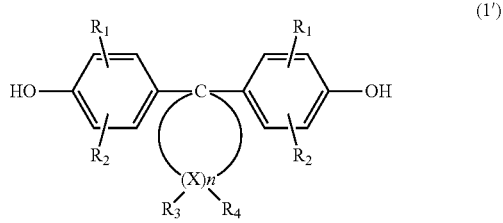

One preferred embodiment uses copolycarbonates of the structure (3c):

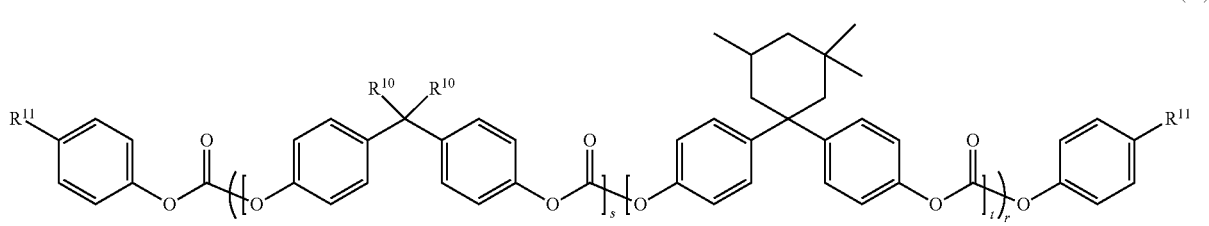

where
$R^{10}$ is $C_1$ to $C_6$ alkyl, preferably $C_1$ to $C_4$ alkyl,
$R^{11}$ is H, n-butyl or tert-butyl, preferably H or tert-butyl,
s and t characterize mol % of the bisphenols used and therefore s and t are each values between 0 and 1 and the sum s+t=1, and
r is determined by the molecular weight.

Especially preferred are copolycarbonates based on bisphenol A and bisphenol TMC (1,1-bis(4-hydroxyphenyl)-3,3,5-trimethylcyclohexane).

These copolycarbonates for use in accordance with the invention preferably have molecular weights Mw (weight average Mw, determined by gel permeation chromatography GPC measurement) of 12 000 to 120 000 g/mol preferably of 15 000 to 80 000 g/mol, more particularly of 18 000 to 60 000 g/mol very preferably of 18 000 to 40 000 g/mol. Molecular weights can also be specified by the number average Mn, determined likewise by GPC after prior calibration to polycarbonate.

The hydroxyaryloxy-terminated siloxanes of the formula (2b) that are for use as component (b) may be obtained in accordance with the process described in US 2013/0267665 A1.

The process of the invention prefers to use siloxanes of the formula (2b) having a weight-average molecular weight Mw of 3000 to 20 000 g/mol, more preferably 3500 to 15 000 g/mol, determined in each case by means of gel permeation chromatography and a bisphenol A standard.

As component (c), use is made of homopolycarbonates having number-average molecular weights of 2000 g/mol, preferably 6500 to 14 000 g/mol (measured according to gel permeation chromatography with polycarbonate standard (bisphenol A-PC)). These homopolycarbonates preferably have a phenolic OH group content of 250 ppm to 1000 ppm, preferably 300 to 900, and especially preferably of 350 to 800 ppm.

Homopolycarbonates based on bisphenol A are used in particular. Very preferably these homopolycarbonates comprise phenol as end group.

Especially suitable here for preparing the block cocondensates of the invention are homopolycarbonates which have been prepared by the melt transesterification process. Especially preferred polycarhonates are those whose preparation is described in DE 102008019503.

The components (a) to (c) are preferably reacted in the following amounts with one another:
(a) 20 to 94.5 wt % of (co)polycarbonate,
(b) 0.5 to 20 wt % of hydroxyaryl-terminated polysiloxane, and
(c) 5 to 79.5 wt % of homopolycarbonate,
based in each case on the total weight of the melt.

Reaction preferably takes place in the presence of a phosphonium catalyst of the formula (4)

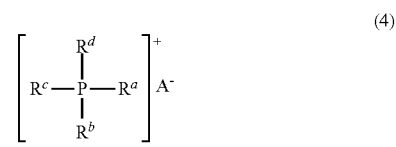

in which
$R^a$, $R^b$, $R^c$ and $R^d$ independently of one another are $C_1$-$C_{10}$ alkyl, $C_6$-$C_{14}$ aryl, $C_7$-$C_{15}$ arylalkyl or $C_5$-$C_6$ cycloalkyl, and
A— is an anion selected from the group consisting of hydroxide, sulphate, hydrogensulphate, hydrogencarbonate, carbonate, halogen and alkoxides, or aroxides of the formula —$OR^e$, where $R^e$ is $C_6$-$C_{14}$ aryl, $C_7$-$C_{15}$ arylalkyl or $C_5$-$C_6$ cycloalkyl.

The homopolycarbonate used preferably has one or more branching-agent structures of the formulae (I) to (IV), as already defined in connection with component (C) of the block cocondensate of the invention.

The total amount of the structural units (1) to (IV) is preferably 50 to 2000 ppm, more preferably 50 to 1000 ppm, especially preferably 80 to 850 ppm (determined by hydrolysis, based on the homopolycarbonate).

The branching-agent structures (I) to (IV) are incorporated here in the polymer chain of the homopolycarbonate.

In order to determine the quantity of the branching-agent structures, the homopolycarbonate is subjected to total hydrolysis to form the corresponding degradation products of the formulae (Ia) to (IVa), as already described in connection with component (C) of the block cocondensate of the invention. The quantities of the degradation products are determined by means of HPLC.

The amount of the compound of the formula (Ia) released in this procedure is preferably 20 to 800 ppm, more preferably 25 to 700 ppm and especially preferably 30 to 500 ppm, based on the homopolycarbonate.

The amount of the compound of the formula (IIa) released in this procedure is preferably 0 (i.e. below the detection limit of 10 ppm) to 100 ppm, more preferably 0 to 80 ppm and especially preferably 0 to 50 ppm, based on the homopolycarbonate.

The amount of the compound of the formula (IIIa) released in this procedure is preferably 0 (i.e. below the detection limit of 10 ppm) to 800 ppm, more preferably 10 to 700 ppm and especially preferably 20 to 600 ppm, and with very particular preference 30 to 350 ppm, based on the homopolycarbonate.

The amount of the compound of the formula (IVa) released in this procedure is preferably 0 (i.e. below the detection limit of 10 ppm) to 300 ppm, preferably 5 to 250 ppm and especially preferably 10 to 200 ppm, based on the homopolycarbonate.

For reasons of simplification, the quantity of the structures of the formulae (I) to (IV) is made equal to the quantity of the compounds of the formulae (Ia) to (IVa) released.

A further subject of the invention is a block cocondensate obtained by the process of the invention.

Moulding Compounds

The block cocondensates of the invention are suitable for producing moulding compounds and extrudates and mouldings produced from these compounds.

A further subject of the invention is therefore the use of the block cocondensates for producing moulding compounds and extrudates or mouldings produced from these compounds.

The moulding compounds may further comprise UV absorbers, mould release agents, heat stabilizers and/or processing stabilizers, and optionally further additives.

Examples of suitable UV absorbers are described in EP 1 308 084 A1, in DE 102007011069 A1 and in DE 10311063 A1, for example.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, BASF AG, Ludwigshafen), 2-(2'-hydroxy-5'-(tert-octyl)phenyl)benzotriazole (Tinuvin® 329, BASF AG, Ludwigshafen), 2-(2'-hydroxy-3'-(2-butyl)-5'-(tert-butyl)phenyl)benzotriazole (Tinuvin® 350, BASF AG, Ludwigshafen), bis(3-(2H-benzotriazolyl)-2-hydroxy-5-tert-octyl)methane (Tinuvin® 360, BASF AG, Ludwigshafen), (2-(4,6-diphenyl-1,3,5-triazin-2-yl)-5-(hexyloxy)phenol (Tinuvin® 1577, BASF AG, Ludwigshafen), and also the benzophenones 2,4-dihydroxybenzophenone (Chimasorb® 22, BASF AG, Ludwigshafen) and 2-hydroxy-4-(octyloxy)benzophenone (Chimassorb® 81, Ciba, Basle), 2-propenoic acid, 2-cyano-3,3-diphenyl, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexy)oxy]phenyl-4,6-di(4-phenyl)phenyl-1,3,5-triazine (Tinuvin® 1600, BASF AG, Ludwigshafen) or tetraethyl 2,2'-(1,4-phenylenedimethylidene)bismalonate (Hostavin® B-Cap, Clariant AG). Mixtures of these ultraviolet absorbers may also be used.

Especially preferred UV absorbers are 2-(2'-hydroxy-5'-(test-octyl)phenyl)benzotriazole (Tinuvin® 329, BASF AG, Ludwigshafen), bis(3-(2H-benzotriazolyl)-2-hydroxy-5-tert-octyl)methane (Tinuvin® 360, BASF AG, Ludwigshafen) and 2-(3',5'-bis(1,1-dimethylbenzyl)-2'-hydroxyphenyl)benzotriazole (Tinuvin® 234, BASF AG, Ludwigshafen), with 2-(3',5'-bis(1,1-dimethylbenzyl)-2'-hydroxyphenyl)benzotriazole being especially preferred.

The UV absorbers are used preferably in an amount of 0.05 wt % to 10.00 wt %, more preferably 0.10 wt % to 1.00 wt %, very preferably 0.10 wt % to 0.50 wt % and especially preferably 0.10 wt % to 0.30 wt %, in the moulding compounds of the invention.

Suitable mould release agents are esters of aliphatic long-chain carboxylic acids with mono- or polyhydric aliphatic and/or aromatic hydroxyl compounds.

Aliphatic carboxylic esters used with preference are compounds of the general formula (6):

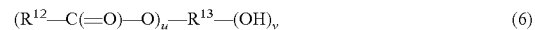

$$(R^{12}-C(=O)-O)_u-R^{13}-(OH)_v \qquad (6)$$

where u is a number from 1 to 4, v is a number from 0 to 3.

$R^{12}$ is an aliphatic, saturated or unsaturated, linear, cyclic or branched alkyl radical, preferably $C_{12}$-$C_{30}$ alkyl radical, and $R^{13}$ is an alkylene radical, preferably $C_2$-$C_{20}$ alkylene radical, of a 1- to 4-hydric aliphatic alcohol $R^{13}$—$(OH)_{u+v}$.

For esters of polyhydric alcohols, there may also be free, unesterifted OH groups present.

Examples of aliphatic carboxylic esters suitable in accordance with the invention are as follows: glycerol monostearate, palmityl palmitate and stearyl stearate. Mixtures of different carboxylic esters of the formula (6) may also be used. Carboxylic esters used with preference are esters of pentaerythritol, glycerol, trimethylolpropane, propanediol, stearyl alcohol, cetyl alcohol or myristyl alcohol with myristic, palmitic, stearic or montanic acid and mixtures thereof. Particularly preferred are pentaerythritol tetrastearate, stearyl stearate and propanediol distearate, and mixtures thereof, and most preferably pentaerythritol tetrastearate.

Examples of aliphatic carboxylic esters suitable in accordance with the invention are glycerol monostearate, palmityl palmitate and stearyl stearate. Mixtures of different carboxylic esters can also be used. Carboxylic esters used with preference are esters of pentaerythritol, glycerol, trimethylolpropane, propanediol, stearyl alcohol, cetyl alcohol or myristyl alcohol with myristic, palmitic, stearic or montanic acid and mixtures thereof.

Particular preference is given to pentaerythritol tetrastearate, stearyl stearate and propanediol distearate, and mixtures thereof. Especially preferred is pentaerythritol tetrastearate.

The mould release agents are used preferably in concentrations of 0.00 wt % to 1.00 wt %, more preferably 0,10 wt % to 0.75 wt %, very preferably 0.15 wt % to 0.60 wt %, and especially preferably 0.20 wt % to 0.50 wt %, based on the weight of the moulding compound.

Suitable heat stabilizers and/or processing stabilizers are preferably selected from the group of the phosphates, phosphines, phosphites and phenolic antioxidants and also mixtures thereof. They are used preferably in an amount of 0.01 wt % to 0.10 wt %, based on the weight of the moulding compounds.

Suitable heat stabilizers are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis (2,4-di-tert-butylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl), pentaerythritol diphosphite, tristearylsorbitol triphosphite, tetrakis(2,4-di-tert-butylphenyl) 4,4'-biphenylene diphosphonite, 6-isooctyloxy-2,4,8,10-tetratert-butyl-12H-dibenzo[d,g]-1,3,2-dioxaphosphocin, bis(2,4-di-cert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocin, 2,2',2''-nitrilo[triethyl tris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl) pentaerythritol diphosphite, triphenylphosphine (TPP), trialkylphenylphosphine, bisdiphenylphosphinoethane and trinaphthylphosphine.

Especially preferred for use are triphenylphosphine (TPP), Irgafos® 168 (tris(2,4-di-tert-butyl-phenyl) phosphite) and tris(nonylphenyl) phosphite or mixtures thereof.

Other heat stabilizers which may be used include phenolic antioxidants such as alkylated monophenols, alkylated thioalkylphenols, hydroquinones and alkylated hydroquinones. Particularly preferred for use are Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl)phenol).

Phosphate-based processing stabilizers can additionally be used. The phosphate in this case preferably has the following structure (7)

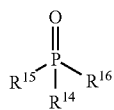

(7)

where $R^{14}$, $R^{15}$ and $R^{16}$ independently of one another may be H, identical or different linear, branched or cyclic alkyl radicals, preferably $C_1$-$C_{18}$ alkyl radicals.

Suitable phosphates are, for example, mono-, di- and trihexyl phosphate, triisooctyl phosphate and trinonyl phosphate.

A preferred phosphate used is triisooctyl phosphate (tris-2-ethylhexyl phosphate). Mixtures of different mono-, di- and trialkyl phosphates may also be used.

The phosphates can be used in amounts of less than 0.05 wt %, preferably from 0.00005 wt % to 0.05 wt %, more preferably 0.0002 to 0.05 wt %, very preferably from 0.0005 wt % to 0.03 wt % and more particularly from 0.001 to 0.0120 wt %, based on the total weight of the moulding compound.

The moulding compounds may comprise further additives, preferably in amounts of 0.10 to 8.00 wt %, more preferably 0.20 to 3.00 wt %.

The further additives are customary polymer additives, such as, for example, the following additives described in EP-A 0 839 623, WO-A 96/15102, EP-A 0 500 496 or "Plastics Additives Handbook", Hans Zweifel, 5th edition 2000, Hanser Verlag, Munich: flame retardants, optical brighteners, flow improvers, inorganic pigments, colorants, mould release agents or processing assistants.

"Colorants" for the purposes of the invention are both dyes and pigments.

Examples of suitable colorants are sulphur-containing pigments such as cadmium red and cadmium yellow, ferrocyanide-based pigments such as Prussian blue, oxide pigments such as titanium dioxide, zinc oxide, red iron oxide, black iron oxide, chromium oxide, titanium yellow, zinc-iron-based brown, titanium-cobalt-based green, cobalt blue, copper-chromium-based black and copper-iron-based black or chromium-based pigments such as chromium yellow, phthalocyanine-derived dyes such as copper phthalocyanine blue and copper phthalocyanine green, fused polycyclic dyes and pigments such as azo-based pigments (e.g. nickel azo yellow), sulphur-indigo dyes, perinone-based, perylene-based, quinacridone-derived, dioxazine-based, isoindolinone-based and quinophthalone-derived derivatives, anthraquinone-based, heterocyclic systems.

Specific examples of commercial products are e.g. MACROLEX® Blue RR, MACROLEX® Violet 3R, MACROLEX® Violet B (Lanxess AG, Germany), Sumiplast® Violet RR, Sumiplast® Violet B, Sumiplast® Blue OR (Sumitomo Chemical Co., Ltd.), Diaresin® Violet D, Diaresin® Blue G, Diaresin® Blue N (Mitsubishi Chemical Corporation), Heliogen® Blue or Heliogen® Green (BASF AG, Germany).

Preferred among these are cyanine derivatives, quinoline derivatives, anthraquinone derivatives, phthalocyanine derivatives and perinone derivatives.

The moulding compounds may further comprise (co) polycarbonates.

Both homopolycarbonates and copolycarbonates are suitable for this purpose. In a known way, they may be linear or branched. The polycarbonates may be prepared in a known way by the melt transesterification process or the interfacial process.

Particularly preferred are homo- and copolycarbonates with structural units which derive from one or more diphenols of the general formula (3), more particularly from bisphenol A. Especially preferred homopolycarbonates are those based on bisphenol A.

The moulding compounds comprising the block cocondensate of the invention are produced using commonplace incorporation techniques, by combining, mixing and homogenizing of the individual constituents, with the homogenizing in particular taking place preferably in the melt under the action of shearing forces. The combining and mixing optionally take place prior to the melt homogenizing, using powder premixes.

It is also possible to use premixes produced from solutions of the mixture components in suitable solvents, optionally with homogenization in solution and subsequent removal of the solvent.

In this context, in particular, the components of the moulding compounds of the invention may be introduced by means of known methods or in the form of masterbatches.

In this connection, the individual components of the moulding compounds may be combined and mixed in customary apparatus such as screw extruders (for example twin-screw extruders, TSE), kneaders, or Brabender or Banbury mills, homogenized, and then extruded. Following extrusion, the extrudate can be cooled and comminuted. It is also possible for individual components to be mixed beforehand and then for the remaining starting materials to be added, individually and/or likewise in mixed form.

The moulding compounds can be processed to products or mouldings by first, for example, extruding the moulding compounds as described to form pellets and processing these pellets by suitable methods in a known way to give different products or mouldings.

In this context, the moulding compounds may be converted by means, for example, of hot compression moulding, spinning, blow moulding, thermoforming, extrusion or injection moulding into products or mouldings, shaped articles such as toy parts, fibres, foils, tapes, panels such as solid panels, sandwich panels, twin-web sandwich panels or corrugated panels, vessels, pipes or other profiles. Also of interest is the use of multi-layer systems. Application may take place along with or immediately after the shaping of the basic body, by means of coextrusion or multi-component injection moulding, for example. Application may alternatively take place to the base body after it has been shaped, by means of lamination with a film or by coating with a solution, for example.

Panels composed of base layer and optional outer layer/optional outer layers (multi-layer systems) may be produced by (co)extrusion, direct skinning, direct coating, insert moulding, in-mould coating, or other suitable methods known to the skilled person.

For extrusion, the moulding compound, optionally pre-treated by means of drying, for example, is supplied to the extruder and is melted in the extruder's plastifying system. The plastics melt is then pressed through a slot die or a sandwich panel die, during which it is shaped, and is then brought into the desired ultimate form in the roll nip of a polishing stack, and its, shape is set by reciprocal cooling on polishing rolls and the ambient air. The temperatures necessary for extruding the composition are set, in which context it is possible usually to follow the manufacturer specifications. Where the moulding compounds include polycarbonates with high melt viscosity, for example, they are normally processed at melt temperatures of 260° C. to 350° C., and the cylinder temperatures of the plastifying cylinder and also the die temperatures are set accordingly.

Through use of one or more ancillary extruders and a multiple-manifold die, or, optionally, suitable melt adapters upstream of a slot die, thermoplastic melts of different composition can be mutually superposed, and multi-layer panels or sheets can be produced accordingly (for the coextrusion, see, for example, EP-A 0 110 221, EP-A 0 110 238 and EP-A 0 716 919; for details of the adapter process and die process, see Johannaber/Ast: "Kunststoff-Maschinenführer", Hanser Verlag, 2000 and in Gesellschaft Kunststofftechnik: "Coextrudierte Folien and Platten: Zukunftsperspektiven, Anforderungen, Anlagen and Herstellung, Qualitätssicherung", VDI-Verlag, 1990).

With the thermoplastic substrates described above, mouldings can also be produced by injection moulding. The techniques for this are known and are described in "Handbuch Spritzgiessen", Friedrich Johannnaber/Walter Michaeli, Munich; Vienna: Hanser, 2001, ISBN 3-446-15632-1 or "Anleitung zum Bau von Spritzgiesswerkzeugen", Menges/Michaeli/Mohren, Munich; Vienna: Hanser, 1999, ISBN 3-446-21258-2.

Injection moulding is a shape conversion process which is used in plastics processing.

By this process, directly usable mouldings in large numbers can be produced economically. Using an injection moulding machine, the material in question, or the moulding compound, is plastified in an injection unit and injected into an injection mould. The inner chamber—the cavity—of the mould determines the shape and the surface structure of the completed component.

Injection moulding here encompasses all injection moulding methods, including multi-component injection moulding and injection compression moulding methods.

Plastics mouldings are produced using the injection moulding and injection compression moulding variants that are known within plastics processing. Conventional injection moulding processes without injection compression moulding technology are used in particular for producing relatively small injection-moulded parts, where the flow pathways are short and only moderate injection pressures need be operated. With conventional injection moulding processes, the plastics compound is injected into a cavity formed between two closed mould plates whose position is fixed, and the compound solidifies within said cavity.

Injection compression moulding processes differ from conventional injection moulding processes in that the injecting and/or solidifying operation is carried out with movement of the mould plates. With the known injection compression moulding process, the mould plates are opened a little even before the injecting operation, in order to compensate the contraction that occurs in the course of the subsequent solidification, and to reduce the injection pressure required. Even at the start of the injecting operation, therefore, a pre-enlarged cavity is present. Flash faces of the mould guarantee that the pre-enlarged cavity is sufficiently leakproof even when the mould plates have been opened somewhat. The plastics compound is injected into this pre-enlarged cavity, and during this procedure or subsequently, is subjected to pressure as the mould moves towards closure. Injection compression moulding technology is more complicated, but is preferred or sometimes essential in particular in the production of mouldings with large surface areas and thin walls, with long flow pathways. This is the only way of reducing the injection pressures required for large mouldings. Furthermore, injection compression moulding can be used to avoid stresses and/or distortion in the injection moulding, caused by high injection pressures. This is particularly important in the production of optical plastics applications, such as glazing (windows) in motor vehicles, for example, since optical plastics applications entail compliance with exacting requirements with regard to absence of stress.

Products, mouldings or shaped articles preferred in accordance with the invention are panels, foils, pipes, glazing, car windows for example, windows of rail and air vehicles, car sunroofs, safety panes, roofing or glazing for buildings, lamp covers for the interior of vehicles and buildings, lamp covers for the exterior, such as covers of street lamps, for example, visors, spectacles, extrusion films and solution films for displays or electrical motors, and also ski foils, traffic-signal housings, traffic-signal coverings, traffic-signal lenses, comprising the moulding compounds of the invention. Not only solid panels but also twin-web sandwich panels or multi-web sandwich panels may be used here. As further components of the products of the invention, in addition to the moulding compounds of the invention, further parts made of material may be present in the products of the invention. For example, glazing systems may have sealing materials at the edge of the glazing. Roofing systems may have, for example, metal components such as screws, metal pins or the like, which may serve for the fastening or guiding (in the case of folding or sliding roofs) of the roofing elements. Furthermore, other materials may be joined with the moulding compounds of the invention, as in 2-component injection moulding, for example. In this way the component in question having IR-absorbing properties may be provided with an edge which serves, for example, for adhesive bonding.

The invention is described in more detail below with reference to working examples, with the determination methods described here being employed for all corresponding variables in the present invention, unless a description has been given to the contrary.

EXAMPLES

Materials:
PC 1:
Linear bisphenol A homopolycarbonate with end groups based on phenol and with a melt volume rate (MVR) of 17cm$^3$/10 min., measured at 250° C. and 2.16 kg loading to ISO 1133, and a number-average molecular weight $M_n$ of about 8100 g/mol. The polycarbonate possesses a relative solution viscosity of 1.205. This polycarbonate contains no additives such as UV stabilizers, mould release agents or heat stabilizers. The polycarbonate was prepared via a melt transesterification process as described in DE 102008019503.

PC 2:

Linear bisphenol A homopolycarbonate with end groups based on phenol and with a melt volume rate (MVR) of 6 cm$^3$/10 min, measured at 300° C. and 1.2 kg loading to ISO 1133, and a number-average molecular weight $M_n$ of about 13 100 g/mol. This polycarbonate contains no additives such as UV stabilizers, mould release agents or heat stabilizers. The polycarbonate is prepared via the interfacial process.

CoPC 1

Linear copolycarbonate based on bisphenol A (58 wt %) and bisphenol TMC (42 wt %), with end groups based on phenol and with a melt volume rate (MVR) of 18 cm$^3$/10 min, measured at 330° C. and 2.16 kg loading to ISO 1133. The product contains triphenylphosphine and pentaerythritol tetrastearate. Copolycarbonates of this kind are available under the trade name Apec® from Bayer MaterialScience.

CoPC 2

Linear copolycarbonate based on bisphenol A (57 wt %) and bisphenol TMC (43 wt %), with end groups based on phenol and with a melt volume rate (MVR) of 9.5 cm$^3$/10 min, measured at 330° C. and 2.16 kg loading to ISO 1133). The product contains triphenylphosphine. Copolycarbonates of this kind are available under the trade name Apec® from Bayer MaterialScience.

Siloxane component:

Siloxane used is hydroquinone-terminated polydimethyl-siloxane of the formula (2 b) (i.e. $R^5$=H, $R^6$, $R^7$=methyl, p=0, o=15, m=3-4), The preparation of the siloxane is described in DE 19710081, for example. The molecular weight is Mw=3700 g/mol (determined via gel permeation chromatography with bisphenol A standard).

Catalyst:

Catalyst used is tetraphenylphosphonium phenolate from the company Rhein Chemie Rheinau GmbH (Mannheim, Germany). The substance is used in the form of a solid solution with phenol and contains approximately 70 wt % tetraphenylphosphonium phenolate. The quantities below relate to the substance obtained from Rhein Chemie (as a solid solution with phenol).

Determination of the Solution Viscosity (eta rel):

The relative solution viscosity ($\eta_{rel}$; also referred to as eta rel) was determined an Ubbelohde viscometer in dichloromethane at a concentration of 5 g/l at 25° C.

Determination of the Melt Viscosity

The flow characteristics are determined via determination of the melt viscosity by means of a cone/plate viscometer. The viscosity value at low shear and at high shear is employed:

The melt viscosities were determined using a Physica UDS 200 rotary oscillation rheometer. A cone/plate geometry was used. The cone angle is 2° and the cone diameter runs to 25 mm (MK 216). In the case of evaporation residues, the samples were first dried in a vacuum drying cabinet at 80° C. and then pressed to thin films with a hot press at 230° C. Isothermal frequency spectra of the complex shear modulus G*=G'+iG" were recorded at 10 K intervals in the temperature range from 330° C. to 260° C. The measuring temperature was then lowered in 10 K steps. The deformation was recorded at 10%. A spectrum from 75 to 0.08 Hz (20 measurement points) was measured in each case.

Determination of the Notched Impact Strength

The notched impact test is carried out by a method based on the Charpy notched impact test.

The test was carried out in accordance with DIN EN ISO 179 using a falling-weight apparatus, on test dumbbells measuring 80×10×3 mm with a 2 mm V-shaped notch. The impact is on the narrow side opposite the notch (notch in tensile zone); the height of fall is 0.5 m; the falling weight is 1.86 kg. The distance between the mounts is 40 mm.

Example 1

Preparation of a Block Copolycarbonate of the Invention

A 250 ml glass flask with stirrer and short-path separator is charged with 119.96 g of copolycarbonate (CoPC 1), 30.0 g of polycarbonate pellets (PC 1), 7.5 g of siloxane (5 wt %) and 0.055 g (0.025 wt %) of tetraphenylphosphonium phenolate solid solution. The apparatus is evacuated and blanketed with nitrogen (3× in each case). The mixture is melted by means of a metal bath preheated to 350° C., under standard pressure (under nitrogen) over the course of 30 minutes. Then vacuum is applied. The pressure in the apparatus is approximately 1.5 mbar. The reaction mixture is held in this vacuum with stirring for 30 minutes. This is followed by blanketing with nitrogen, and the polymer melt is removed. An opaquely white polymer is obtained. The solution viscosity is reported in Table 1.

Example 2

Preparation of a Block Copolycarbonate of the Invention

A 250 ml glass flask with stirrer and short-path separator is charged with 120.7 g of copolycarbonate (CoPC 1), 22.5 g of polycarbonate pellets (PC 1), 6.75 g of siloxane (4.5 wt %) and 0.0375 g (0.025 wt %) of tetraphenylphosphonium phenolate solid solution. The apparatus is evacuated and blanketed with nitrogen (3× in each case). The mixture is melted by means of a metal bath preheated to 350° C., under standard pressure (under nitrogen) over the course of 30 minutes. Then vacuum is applied. The pressure in the apparatus is approximately 1.5 mbar. The reaction mixture is held in this vacuum with stirring for 30 minutes. This is followed by blanketing with nitrogen, and the polymer melt is removed. An opaquely white polymer is obtained. The solution viscosity is reported in Table 1.

Example 3

Preparation of a TMC-Containing Block Cocondensate (Comparative, Without Homopolycarbonate Blocks)

A 250 ml glass flask with stirrer and short-path separator is charged with 189.95 g of copolycarbonate (CoPC 1), 10.0 g of siloxane (5.0 wt %) and 0.071 g (0.025 wt %) of tetraphenylphosphonium phenolate solid solution. The apparatus is evacuated and blanketed with nitrogen (3× in each case). The mixture is melted by means of a metal bath preheated to 350° C., under standard pressure (under nitrogen) over the course of 10 minutes. Then vacuum is applied. The pressure in the apparatus is approximately 1.5 mbar. The reaction mixture is held in this vacuum with stirring for 30 minutes. This is followed by blanketing with nitrogen, and the polymer melt is removed. An opaquely white polymer is obtained. The solution viscosity is reported in Table 1.

Example 4

(Comparative, Without Siloxane Blocks, Without Homopolycarbonate Blocks)

Corresponds to CoPC 1

Example 5

Preparation of a Blend of BPA-Based Homopolycarbonate PC 2 and Copolycarbonate CoPC 2 (Comparative, Without Siloxane Blocks)

85 wt % of CoPC 2 and 15 wt % of PC 2 are weighed out in a 250 ml glass flask with stirrer. The apparatus is evacuated and blanketed with nitrogen (3× in each case). The mixture is melted by means of a metal bath preheated to 350° C., under standard pressure (under nitrogen) over the course of 10 minutes. The melt is stirred under standard pressure for 15 minutes. This is followed by blanketing with nitrogen, and the polymer melt is removed. A transparent polymer is obtained. The properties are reported in Table 1.

TABLE 1

|  | Example 1 (inventive) | Example 2 (inventive) | Example 3 (comparative, without homo-PC) | Example 4 (comparative, without siloxane, without homo-PC) | Example 5 (comparative, without siloxane) |
|---|---|---|---|---|---|
| Tg (DSC) [° C.] | 179 | 181 | 185 | 187 | 180 |
| Notched impact Charpy $A_k$ [kJ/m²] | 46.1 tough | 44.2 tough | 20.4 brittle | 5.1 brittle | 9.7 brittle |
| Solution viscosity eta rel | 1.301 | 1.327 | 1.307 | 1.25 | 1.284 |
| Viscosity [Pas] (Circular freq.: 1/s) | 1370 | 1940 | 2160 | 910 | 834 |
| Viscosity [Pas] (Circular freq.: 500/s) | 373 | 593 | 587 | about 470 | 450 |

It is seen that the moulding compounds of the invention exhibit a tough behaviour in the notched impact test (Examples 1 and 2). TMC-containing copolycarbonates, for their part, exhibit a brittle behaviour in the notched impact test (Example 4). From experience, blends of homopolycarbonate and TMC-containing copolycarbonate also exhibit brittle behaviour over wide mixing ranges. Surprisingly, the behaviour of a siloxane-containing block copolymer which has been obtained by a different process, without using the homopolycarbonate PC 1, is likewise brittle (Example 3).

Relative to the prior art, furthermore, the moulding compounds of the invention also display advantages in flowability. Despite the fact that the block polycarbonate of the invention from Example 1 has a higher molecular weight in comparison to the copolycarboriate from Example 4 or to the blend from Example 5 (as indicated by the higher solution viscosity and the higher zero-shear viscosity), the flowability under shear is, surprisingly, better. Accordingly, the moulding compounds of the invention display distinct advantages in terms of both mechanical and rheological properties.

The invention claimed is:
1. A block cocondensate comprising
   (A) 1-80 wt % of structural units of the general formula (1), based on the total weight of the block cocondensate,

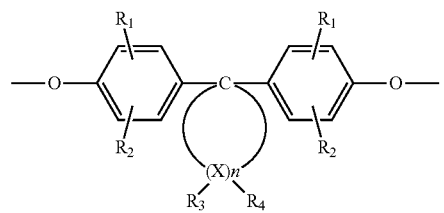

in which $R^1$ and $R^2$ independently of one another are hydrogen, halogen, $C_1$-$C_8$ alkyl, $C_5$-$C_6$ cycloalkyl, phenyl or $C_7$-$C_{12}$ aralkyl, $R^3$ and $R^4$ for each X are individually selectable and independently of one another are hydrogen or $C_1$-$C_6$ alkyl, and n is an integer from 4 to 7, X is carbon, with the proviso that on at least one atom X $R^3$ and $R^4$ are $C_1$-$C_6$ alkyl;

(B) siloxane blocks of the general formula (2)

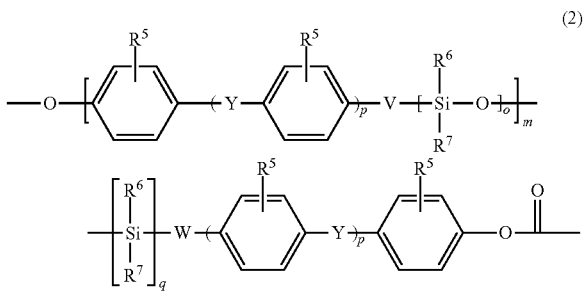

where
$R^5$ is H,
$R^6$ and $R^7$ are each methyl,
V is O,
W is a single bond,
Y is isopropylidene,
m is an average number of repeat units from 2 to 5,
o is an average number of repeat units from 10 to 100,
q is 0, and
p is 0 or 1; and the product of m times o is a number between 15 and 200, and (C) homopolycarbonate blocks which contain no structural units of the formula (1) and have a number-average molecular weight $M_n$ of at least 2000 g/mol.

2. The block cocondensate according to claim 1, wherein the homopolycarbonate blocks derive from a homopolycarbonate obtained by the melt transesterification process.

3. The block cocondensate according to claim 1, wherein the homopolycarbonate blocks (C) are based on bisphenol A.

4. The block cocondensate according to claim 1, comprising copolycarbonate blocks which contain the structural units of the general formula (1).

5. The block cocondensate according to claim 4, wherein the copolycarbonate blocks further have structural units which derive from a diphenol of the formula (3)

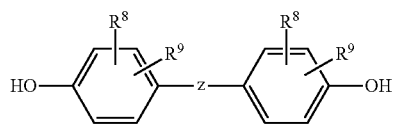

(3)

in which
R$^8$ and R$^9$ independently of one another are H, $C_1$-$C_{18}$ alkyl, $C_1$-$C_{18}$ alkoxy, halogen or optionally substituted aryl or aralkyl, and
Z is a single bond, —CO—, —O—, $C_1$ to $C_6$ alkylene, $C_2$ to $C_5$ alkylidene, is a $C_5$ to $C_6$ cycloalkylidene radical which may be substituted one or more times by $C_1$ to $C_4$ alkyl, or is $C_6$ to $C_{12}$ arylene, which may be fused to a further aromatic ring containing heteroatoms.

6. The block cocondensate according to claim 4, wherein the copolycarbonate blocks further have structural units which derive from bisphenol A.

7. The block cocondensate according to claim 1, wherein the fraction of the siloxane blocks of the formula (2) in the block cocondensate is 0.5 to 20.0 wt %, based on the total weight of the block cocondensate.

8. Process for preparing the block cocondensate according to claim 1, comprising the reaction of
(a) a (co)polycarbonate comprising structural units of the general formula (1)
(b) a hydroxyaryl-terminated polysiloxane of the formula (2b)

where R$^5$, R$^6$, R$^7$, V, W, Y, o, p, q and m have the same definition as in formula (2) according to claim 1;
(c) and a homopolycarbonate
in the melt.

9. The process according to claim 8, wherein the homopolycarbonate has been prepared by the melt transesterification process.

10. The process according to claim 8, wherein the homopolycarbonate has a number-average molecular weight of at least 2000 g/mol, and an OH end group content of 300 to 900 ppm.

11. The process according to claim 8, wherein components (a) to (c) are present in the following amounts in the melt:
(a) 20 to 94.5 wt % of the (co)polycarbonate,
(b) 0.5 to 20 wt % of the hydroxyaryl-terminated polysiloxane, and
(c) 5 to 79.5 wt % of the homopolycarbonate,
based in each case on the total weight of the melt.

12. The process according to claim 8, wherein the homopolycarbonate is based on bisphenol A and the copolycarbonate is based on bisphenol A and bisphenol TMC.

13. The block cocondensate according to claim 1, obtained by reacting
(a) a (co)polycarbonate comprising structural units of the general formula (1)

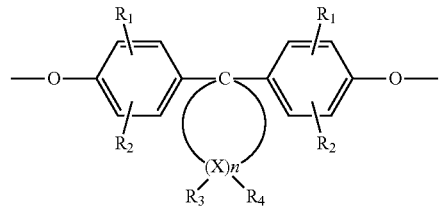

in which
R$^1$ and R$^2$ independently of one another are hydrogen, halogen, $C_1$-$C_8$ alkyl, $C_5$-$C_6$ cycloalkyl, phenyl or $C_7$-$C_{12}$ aralkyl,
R$^3$ and R$^4$ for each X are individually selectable and independently of one another are hydrogen or $C_1$-$C_6$ alkyl, and
n is an integer from 4 to 7,
X is carbon,
with the proviso that on at least one atom X R$^3$ and R$^4$ are $C_1$-$C_6$ alkyl;
(b) a hydroxyaryl-terminated polysiloxane of the formula (2b)

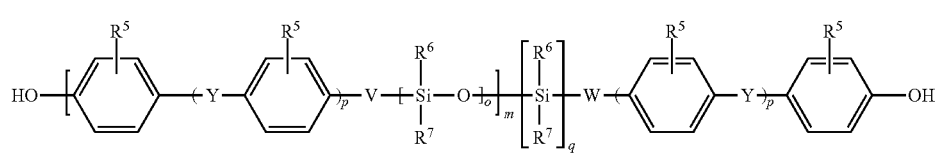

(2b)

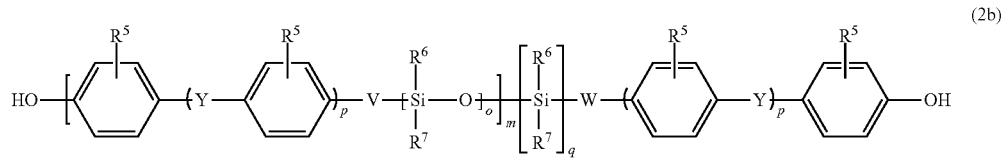
(2b)

$R^5$ is H,
$R^6$ and $R^7$ are each methyl,
V is O,
W is a single bond,
Y is isopropylidene,
m is an average number of repeat units from 2 to 5,
o is an average number of repeat units from 10 to 100,
q is 0, and
p is 0 or 1; and the product of m times o is a number between 15 and 200; and (c) and a homopolycarbonate which contains no structural units of the formula (1) and has a number-average molecular weight $M_n$ of at least 2000 g/mol in the melt.

14. A method comprising utilizing the block cocondensates according to claim 1 for producing mouldings and extrudates.

15. A moulding or extrudate comprising a block cocondensate according to claim 1.

* * * * *